United States Patent
Moses

[19]

[11] Patent Number: 6,122,948
[45] Date of Patent: Sep. 26, 2000

[54] METHOD OF HYDROFORMING A FRONT AXLE BEAM

[75] Inventor: David G. Moses, Decatur, Ind.

[73] Assignee: Dana Corporation, Toledo, Ohio

[21] Appl. No.: 09/474,331

[22] Filed: Dec. 29, 1999

Related U.S. Application Data

[60] Provisional application No. 60/114,500, Dec. 31, 1998.

[51] Int. Cl.$^7$ .......................... B21D 39/20; B21D 26/02
[52] U.S. Cl. .......................... 72/61; 72/370.06; 29/897.2
[58] Field of Search .................. 72/60, 61, 62, 72/370.1, 370.06; 29/897.2

[56] References Cited

U.S. PATENT DOCUMENTS

| | | |
|---|---|---|
| 2,718,048 | 9/1955 | Sedgwick . |
| 3,583,188 | 6/1971 | Nakamura . |
| 5,107,693 | 4/1992 | Olszewski et al. . |
| 5,333,775 | 8/1994 | Bruggemann et al. . |
| 5,398,533 | 3/1995 | Shimanovski et al. . |
| 5,445,001 | 8/1995 | Snavely . |
| 5,557,961 | 9/1996 | Ni et al. ........................ 72/61 |
| 5,662,349 | 9/1997 | Hasshi et al. .................. 29/897.2 |
| 5,673,929 | 10/1997 | Alatalo ........................ 29/897.2 |
| 5,718,048 | 2/1998 | Horton et al. .................. 72/61 |
| 5,862,877 | 1/1999 | Horton et al. .................. 72/61 |
| 6,006,568 | 12/1999 | Bihrer .......................... 72/61 |
| 6,016,603 | 1/2000 | Marando et al. ............... 29/897.2 |

FOREIGN PATENT DOCUMENTS

| | | | |
|---|---|---|---|
| 294972 A1 | 4/1981 | Germany ........................ | 72/61 |

*Primary Examiner*—David Jones
*Attorney, Agent, or Firm*—MacMillan, Sobanski, & Todd, LLC

[57] ABSTRACT

A method for manufacturing a non-driving, rigid axle beam for use in a vehicle frame and suspension system includes the initial step of providing a tubular blank. The tubular blank is disposed within a die having cooperating die sections that define a cavity having a shape that corresponds with the desired shape of the non-driving axle beam. Next, pressurized fluid is provided within the tubular blank so as to deform the tubular blank into conformance with the die cavity. A steering knuckle can be pivotably connected to each end of the non-driving axle beam by securing a hollow cylindrical support to each end of the non-driving axle beam and pivotably connecting a steering knuckle to each end of the hollow cylindrical supports. The non-driving axle beam can be formed having any desired cross sectional shape, including circular, triangular, I-shaped, and oval.

30 Claims, 5 Drawing Sheets

METHOD OF HYDROFORMING A FRONT AXLE BEAM

CROSS REFERENCE TO RELATED APPLICATION

This application claims the benefit of U.S. Provisional Application No. 60/114,500, filed Dec. 31, 1998, the disclosure of which is incorporated herein by reference.

BACKGROUND OF THE INVENTION

This invention relates in general to rigid axle beams for use in a vehicle suspension system. More specifically, this invention relates to a method of manufacturing a rigid axle beam for use in such a vehicle suspension system.

Virtually all land vehicles in common use, such as automobiles, vans, and trucks, include a frame assembly that is supported upon a plurality of ground-engaging wheels by a resilient suspension system. The structures of known vehicle frame assemblies can be divided into two general categories, namely, separate and unitized. In a typical separate vehicle frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate vehicle frame assemblies of this general type are found in most older vehicles, but remain in common use today for many relatively large or specialized use modern vehicles, such as large vans, sport utility vehicles, and trucks. In a typical unitized vehicle frame assembly, the structural components of the body portion and the frame portion are combined into an integral unit which is resiliently supported upon the vehicle wheels by the suspension system. Unitized vehicle frame assemblies of this general type are found in many relatively small modern vehicles, such as automobiles and minivans.

In both separate and unitized types of vehicle frame assemblies, the suspension system resiliently supports the vehicle frame assembly on the rotatable wheels of the vehicle. One type of suspension system that is commonly used in vehicles is a rigid axle suspension system. In a rigid axle suspension system, a single axle beam extends between and is connected to the wheels of the vehicle. To accomplish this, a steering knuckle is pivotably connected to each end of the rigid axle beam. Each of the steering knuckles includes an inwardly extending yoke, which is pivotably connected to the associated end of the rigid axle beam, and an outwardly extending spindle, upon which the wheels of the vehicle can be rotatably mounted. Thus, the steering knuckles permit the wheels of the vehicle to pivot relative to the rigid axle beam to facilitate steering of the vehicle.

The rigid axle beam provides a support surface upon which the vehicle frame assembly can be supported. Usually, one or more resilient spring assemblies is provided between the rigid axle beam and the vehicle frame assembly supported thereon. The resilient spring assemblies allow the rigid axle beam and the wheels to move upwardly and downwardly relative to the vehicle frame assembly. Thus, when a bump or a depression in the road upon which the vehicle is operated is encountered, the resilient spring assemblies accommodate much of the movement of the rigid axle beam and the wheels so as to provide a relatively smooth ride.

Traditionally, the rigid axle beams used in these and other types of vehicle suspension systems have been formed from one or more solid pieces of material that have been formed and secured together into a desired shape. Forging is one known method for forming such rigid axle beams for vehicular suspension systems. Rigid axle beams formed from one or more solid pieces of material are best suited for non-driving applications, i.e., applications where the wheels that are connected to the ends of the rigid axle beam are not rotatably driven by an engine of the vehicle. Thus, solid axle beams of this general type are commonly used as front axle beams in rear wheel drive vehicles and as rear axle beams in front wheel drive vehicles. Although forging and other methods have been used successfully for many years in the manufacture of such non-driving, rigid axle beams, it would be desirable to provide an improved method for manufacturing a non-driving, rigid axle beam for use in a vehicle frame assembly.

SUMMARY OF THE INVENTION

This invention relates to an improved method for manufacturing a non-driving, rigid axle beam for use in a vehicle frame and suspension system. Initially, a tubular blank is provided. The tubular blank is disposed within a die having cooperating die sections that define a cavity having a shape that corresponds with the desired shape of the non-driving axle beam. Next, pressurized fluid is provided within the tubular blank so as to deform the tubular blank into conformance with the die cavity. A steering knuckle can be pivotably connected to each end of the non-driving axle beam by securing a hollow cylindrical support to each end of the non-driving axle beam and pivotably connecting a steering knuckle to each end of the hollow cylindrical supports. The non-driving axle beam can be formed having any desired cross sectional shape, including circular, triangular, I-shaped, and oval.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
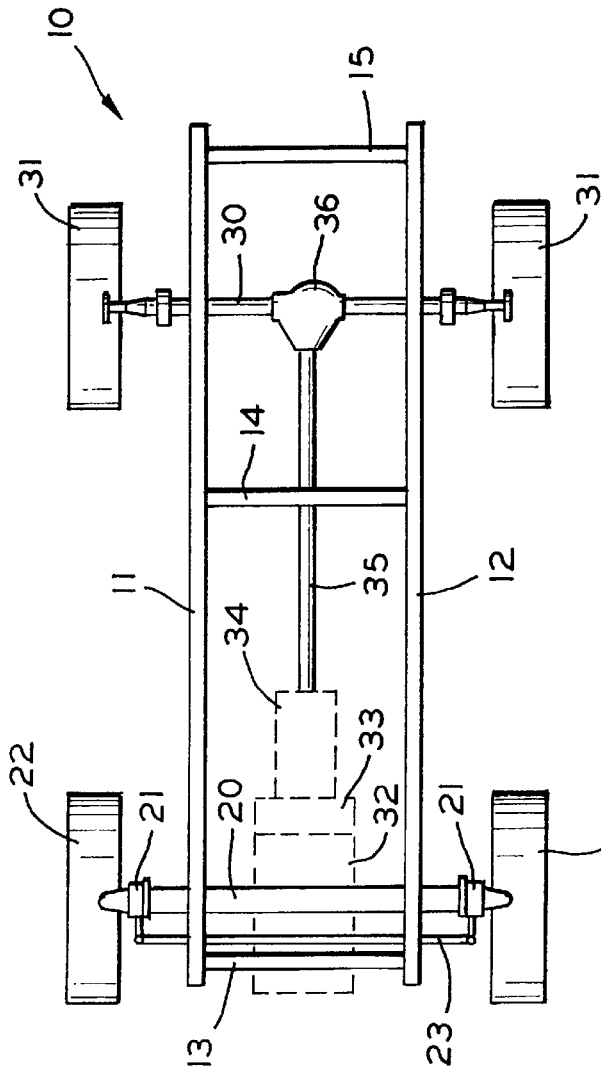
FIG. 1 is a schematic top plan view of a frame assembly and suspension system for a vehicle that is conventional in the art.

Referring now to the drawings, there is schematically illustrated in FIG. 1 a frame assembly and suspension system, indicated generally at 10, for a vehicle that is conventional in the art. The illustrated prior art frame and suspension system 10 includes a ladder frame assembly composed of a pair of longitudinally extending side rails 11 and 12 having a plurality of transverse cross members 13, 14, and 15 extending therebetween. The side rails 11 and 12 extend longitudinally throughout the entire length of the assembly 10 and are generally parallel to one another. The cross members 13, 14, and 15 extend generally perpendicular to the side rails 11 and 12. The cross members 13, 14, and 15 are spaced apart from one another along the length of the assembly 10 and can be secured to the side rails 11 and 12 by any conventional means, such as by welding, riveting, bolting, and the like. When secured to the side rails 11 and 12, the cross members 13, 14, and 15 provide lateral and torsional rigidity to the ladder frame assembly 10. The side rails 11 and 12 and the cross members 13, 14, and 15 may be formed having any conventional structures.

The illustrated prior art frame and suspension system 10 also includes a front suspension assembly composed of a rigid front axle beam 20 having a pair of steering knuckles 21 pivotably connected to the ends thereof in a known manner. Each of the steering knuckles 21 has an outwardly extending spindle, upon which respective front wheels 22 of the vehicle can be rotatably mounted. A steering control arm 23 extends between the two steering knuckles 21 to maintain the front wheels 22 in a generally parallel relationship during operation of the vehicle. Movement of the steering control arm 23 is controlled by an operator of the vehicle by means of a conventional steering assembly (not shown). Thus, the steering control arm 23 and the steering knuckles 21 permit the front wheels 22 of the vehicle to pivot relative to the rigid front axle beam 20 to facilitate steering of the vehicle.

Figure 2:
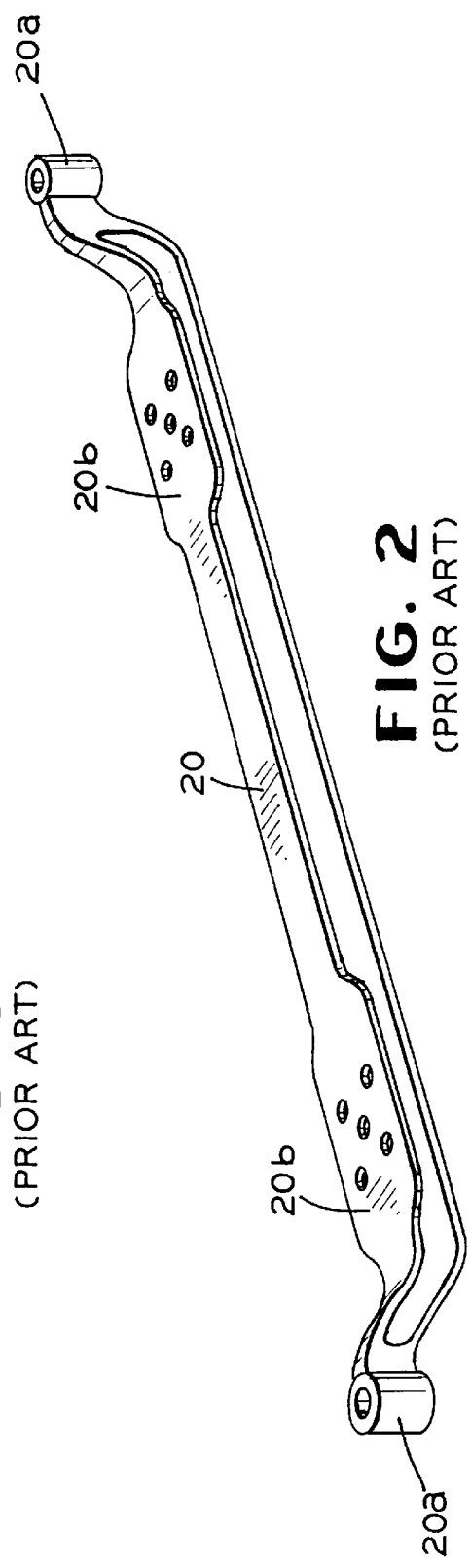
FIG. 2 is a perspective view of a non-driving, rigid front axle beam used in the frame assembly and suspension system illustrated in FIG. 1.

The structure of the rigid front axle beam 20 is more clearly illustrated in FIG. 2. As shown therein, the rigid front axle beam 20 is formed from a solid piece of material, typically by forging. In the illustrated embodiment, the rigid front axle beam 20 is formed from a single piece of material. However, it is also known to form the rigid front axle beam 20 from a plurality of solid pieces of material that have been formed and secured together to achieve a desired shape. A pair of hollow cylindrical supports 20a are formed or otherwise provided at the ends of the rigid front axle beam 20. The supports 20a are provided to facilitate the pivotable connection between the steering knuckles 21 and the ends of the rigid front axle beam 20.

The rigid front axle beam 20 provides a first support surface upon which a portion of the vehicle frame assembly can be supported. Usually, a pair of resilient spring assemblies (not shown) is provided between the rigid front axle beam 20 and the side rails 11 and 12 of the ladder frame assembly supported thereon. To facilitate this, the rigid front axle beam 20 has a pair of mounting pads 20b formed on the upper surface thereof. Each of the mounting pads 20b includes an enlarged surface for supporting a portion of the associated resilient spring assembly thereon. A plurality of apertures are formed through each of the mounting pads 20b to facilitate the securement of the resilient spring assemblies thereto. The resilient spring assemblies allow the rigid front axle beam 20 and the wheels 22 connected thereto to move upwardly and downwardly relative to the ladder frame assembly. Thus, when a bump or a depression in the road upon which the vehicle is operated is encountered, the resilient spring assemblies accommodate much of the movement of the rigid front axle beam 20 and the wheels 22 so as to provide a relatively smooth ride.

Referring back to FIG. 1, the illustrated prior art frame and suspension system 10 further includes a rear suspension assembly composed of a hollow rear axle housing 30 having a pair of rear wheels 31 rotatably supported thereon. The rear wheels 31 of the vehicle are rotatably driven by an engine 32 through a clutch 33, a transmission 34, a driveshaft assembly 35, and a differential 36. In a manner that is well known in the art, the differential divides the rotational power provided by the engine 32 through the driveshaft assembly 35 to each of the rear wheels 31 of the vehicle through respective axle shafts (not shown) contained within the hollow rear axle housing 30. Unlike the front wheels 22, the rear wheels 31 of the vehicle typically are not pivotable relative to the hollow rear axle housing 30. Usually, a pair of resilient spring assemblies (not shown) is provided between the hollow rear axle housing 30 and the side rails 11 and 12 of the ladder frame assembly supported thereon for the same reasons as described above.

Figure 3:
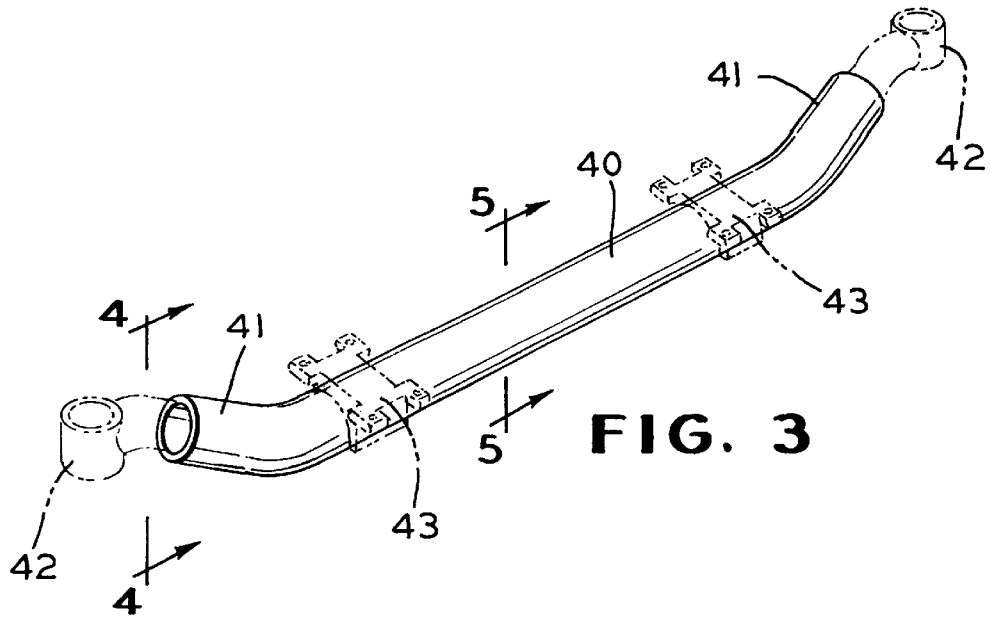
FIG. 3 is a perspective view of a first embodiment of a non-driving, hollow front axle beam manufactured in accordance with the method of this invention that can be used in the frame assembly and suspension system illustrated in FIG. 1.
Figure 4:
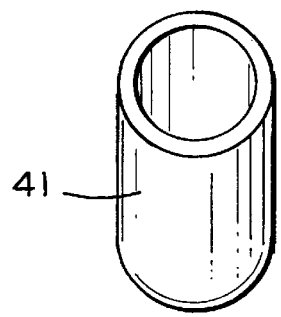
FIG. 4 is an end elevational view of a portion of the non-driving, hollow front axle beam taken along line 4—4 of FIG. 3.
Figure 5:
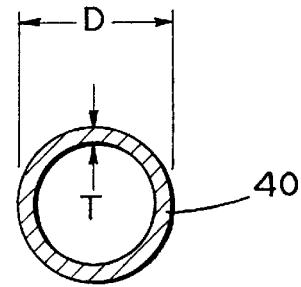
FIG. 5 is a sectional elevational view of a portion of the non-driving, hollow front axle beam taken along line 5—5 of FIG. 3.

Referring now to FIGS. 3, 4, and 5, there is illustrated a first embodiment of a non-driving, hollow front axle beam 40 that has been manufactured in accordance with the method of this invention and that can be used in the frame assembly and suspension system 10 illustrated in FIG. 1. As shown therein, the hollow front axle beam 40 is hollow and has a generally circular cross sectional shape throughout most of its entire length. If desired, end portions 41 of the hollow front axle beam 40 can extend at an angle relative to the central portion thereof. A pair of hollow cylindrical supports 42 may be secured to the end portions 41 of the hollow front axle beam 40, such as by welding or other means. The supports 42 are provided to facilitate the pivotable connection between the steering knuckles 21 and the ends of the hollow front axle beam 40 in the manner described above. A pair of mounting pads 43 may also be secured to the hollow front axle beam 40, such as by welding or other means. The mounting pads 43 are provided to facilitate the connection of a pair of resilient spring assemblies (not shown) between the hollow front axle beam 40 and the side rails 11 and 12 of the ladder frame assembly supported thereon in the manner described above. Preferably, the hollow front axle beam 40 has a substantially uniform wall thickness T and a substantially uniform outer diameter D throughout most of its entire length.

Figure 6:
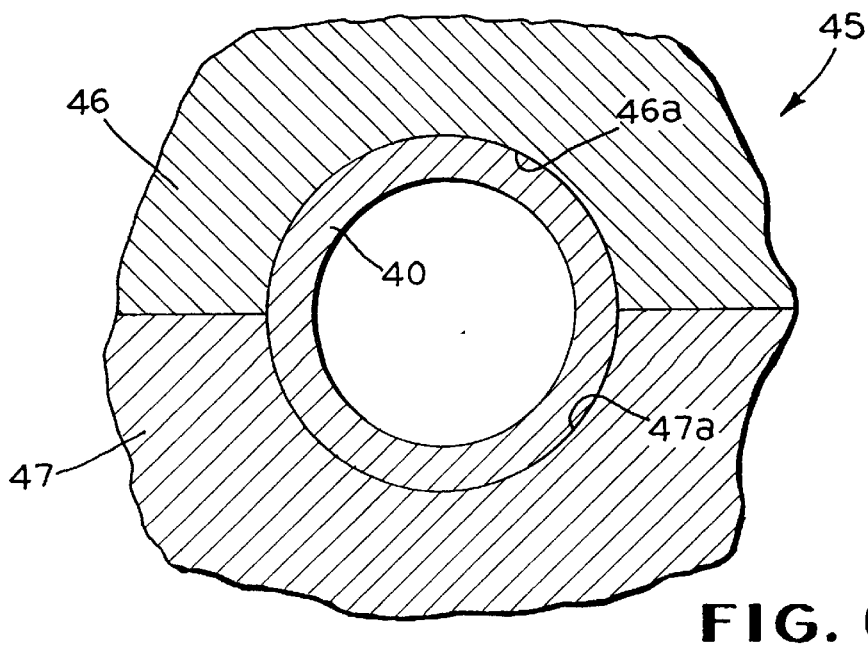
FIG. 6 is a sectional elevational view of a portion of a hydroforming apparatus showing the formation of the non-driving, hollow front axle beam illustrated in FIGS. 3, 4, and 5.

Referring now to FIG. 6, there is illustrated a portion of a hydroforming apparatus, indicated generally at 45, for forming the non-driving, hollow front axle beam 40 illustrated in FIGS. 3, 4, and 5. The hydroforming apparatus 45 is conventional in the art and includes a frame (not shown) having a pair of opposed die sections 46 and 47 that are supported thereon for relative movement between opened and closed positions. The die sections 46 and 47 have cooperating recesses 46a and 47a formed therein which together define a die cavity having a shape corresponding to a desired final shape for a workpiece 40. When moved to the opened position (not shown), the die sections 46 and 47 are spaced apart from one another to allow a workpiece 40 to be inserted within or removed from the die cavity. When moved to the closed position illustrated in FIG. 6, the die sections 46 and 47 are disposed adjacent to one another so as to enclose the workpiece 40 within the die cavity. Although the die cavity is usually somewhat larger than the workpiece 40 to be hydroformed, movement of the two die sections 46 and 47 from the opened position to the closed position may, in some instances, cause some mechanical deformation of the workpiece 40. In any event, the workpiece 40 is then filled with a fluid, typically a relatively incompressible liquid such as water. The pressure of the fluid within the workpiece 40 is increased to such a magnitude that the workpiece 40 is expanded outwardly into conformance with the die cavity. As a result, the workpiece 40 is deformed into the desired final shape for the hollow, non-driving axle housing 40.

In a typical hydroforming apparatus 45, the two die sections 46 and 47 are arranged such that an upper die section 46 is supported on a ram (not shown) of the apparatus 45, while a lower die section 47 is supported on a bed (not shown) of the apparatus 45. A mechanical or hydraulic actuator is provided for raising the ram and the upper die section 46 upwardly to the opened position relative to the bed and the lower die section 47, thereby allowing a previously deformed workpiece 40 to be removed from the die cavity and new workpiece 40 to be inserted therein. The actuator also lowers the ram and the upper die section 46 downwardly to the closed position relative to the bed and the lower die section 47, allowing the hydroforming process to be performed. To maintain the die sections 46 and 47 together during the hydroforming process, a mechanical clamping device is usually provided. The mechanical clamping device mechanically engages the die sections 46 and 47 (or, alternatively, the ram and the base upon which the die sections 46 and 47 are supported) to prevent them from moving apart from one another during the hydroforming process. Such movement would obviously be undesirable because the shape of the die cavity would become distorted, resulting in unacceptable variations in the final shape of the workpiece 40.

As shown in FIG. 6, the hollow front axle beam 40 can be formed to the shape illustrated in FIGS. 3, 4, and 5 by the hydroforming apparatus 45. To accomplish this, the end portions 41 of the hollow front axle beam 40 are initially bent in a conventional tube bending apparatus (not shown) prior to being disposed within the so as to attain a shape that generally corresponds to the desired final shape of the hollow front axle beam 40. Then, the hollow front axle beam 40 is disposed within the hydroforming apparatus 45 and deformed to the desired final shape illustrated in FIGS. 3, 4, and 5. Following formation, the hollow front axle beam 40 can be assembled with the other components described above to form the frame and suspension system 10.

Figure 7:
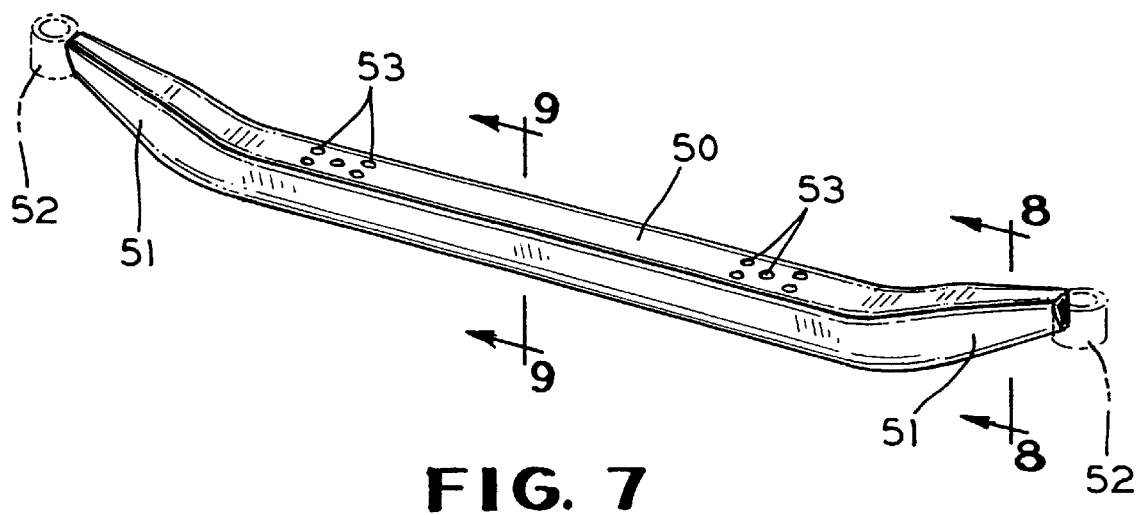
FIG. 7 is a perspective view of a second embodiment of a non-driving, hollow front axle beam manufactured in accordance with the method of this invention that can be used in the frame assembly and suspension system illustrated in FIG. 1.
Figure 8:
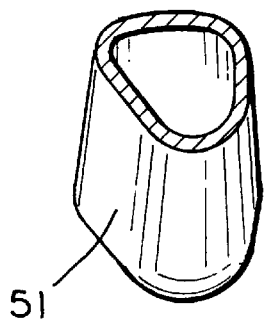
FIG. 8 is an end elevational view of a portion of the non-driving, hollow front axle beam taken along line 8—8 of FIG. 7.

Referring now to FIGS. 6, 7, and 8, there is illustrated a second embodiment of a non-driving, hollow front axle beam 50 that has been manufactured in accordance with the method of this invention and that can be used in the frame assembly and suspension system 10 illustrated in FIG. 1. As shown therein, the hollow front axle beam 50 is hollow and has a generally triangular cross sectional shape throughout most of its entire length. If desired, end portions 51 of the hollow front axle beam 50 can extend at an angle relative to the central portion thereof. A pair of hollow cylindrical supports 52 may be secured to the end portions 51 of the hollow front axle beam 50, such as by welding or other means. The supports 52 are provided to facilitate the pivotable connection between the steering knuckles 21 and the ends of the hollow front axle beam 50 in the manner described above. The hollow front axle beam 50 has a generally flat upper surface. Thus, a plurality of apertures 53 may be formed through the upper surface of the hollow front axle beam 50 to facilitate the connection of a pair of resilient spring assemblies (not shown) between the hollow front axle beam 50 and the side rails 11 and 12 of the ladder frame assembly supported thereon in the manner described above, obviating the need for separate mounting pads as described above. Preferably, the hollow front axle beam 50 has a substantially uniform wall thickness T throughout most of its entire length.

Figure 9:
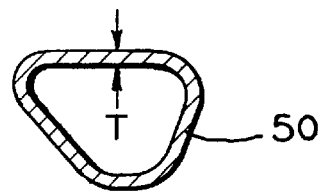
FIG. 9 is a sectional elevational view of a portion of the non-driving, hollow front axle beam taken along line 9—9 of FIG. 7.
Figure 10:
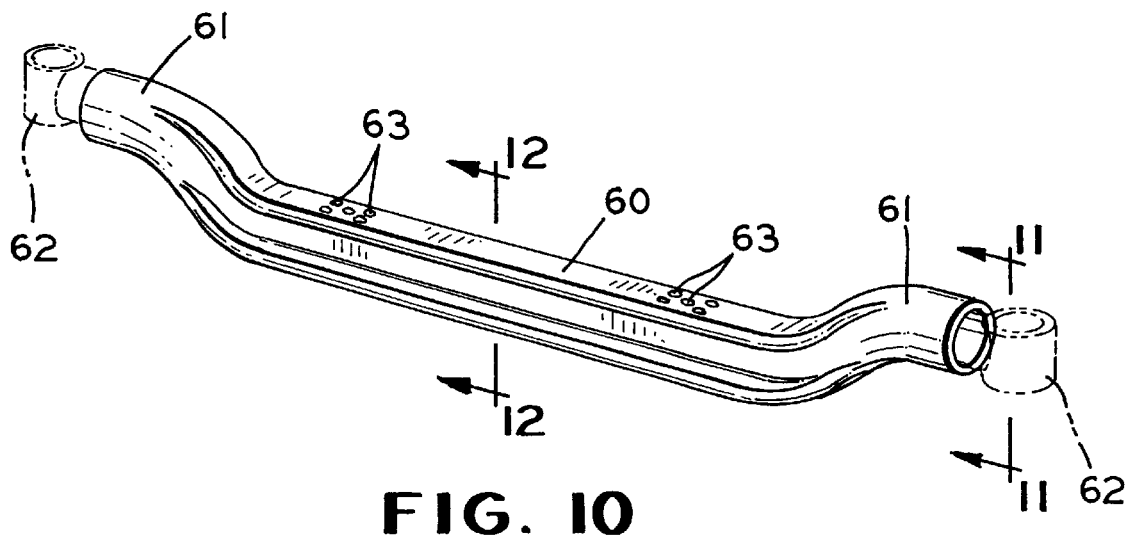
FIG. 10 is a perspective view of a third embodiment of a non-driving, hollow front axle beam manufactured in accordance with the method of this invention that can be used in the frame assembly and suspension system illustrated in FIG. 1.
Figure 11:
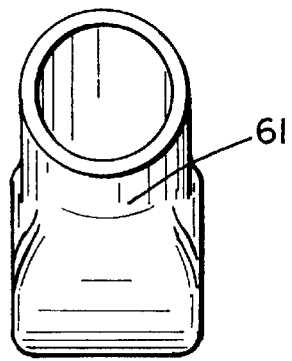
FIG. 11 is an end elevational view of a portion of the non-driving, hollow front axle beam taken along line 11—11 of FIG. 10.
Figure 12:
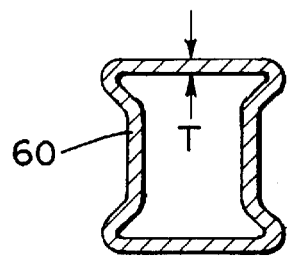
FIG. 12 is a sectional elevational view of a portion of the non-driving, hollow front axle beam taken along line 12—12 of FIG. 10.

Referring now to FIGS. 9, 10, and 11, there is illustrated a third embodiment of a non-driving, hollow front axle beam 60 that has been manufactured in accordance with the method of this invention and that can be used in the frame assembly and suspension system 10 illustrated in FIG. 1. As shown therein, the hollow front axle beam 60 is hollow and has a generally I-shaped cross sectional shape throughout most of its entire length. If desired, end portions 61 of the hollow front axle beam 60 can extend at an angle relative to the central portion thereof. A pair of hollow cylindrical supports 62 may be secured to the end portions 61 of the hollow front axle beam 60, such as by welding or other means. The supports 62 are provided to facilitate the pivotable connection between the steering knuckles 21 and the ends of the hollow front axle beam 60 in the manner described above. The hollow front axle beam 60 has a generally flat upper surface. Thus, a plurality of apertures 63 may be formed through the upper surface of the hollow front axle beam 60 to facilitate the connection of a pair of resilient spring assemblies (not shown) between the hollow front axle beam 60 and the side rails 11 and 12 of the ladder frame assembly supported thereon in the manner described above, obviating the need for separate mounting pads as described above. Preferably, the hollow front axle beam 60 has a substantially uniform wall thickness T throughout most of its entire length.

Figure 13:
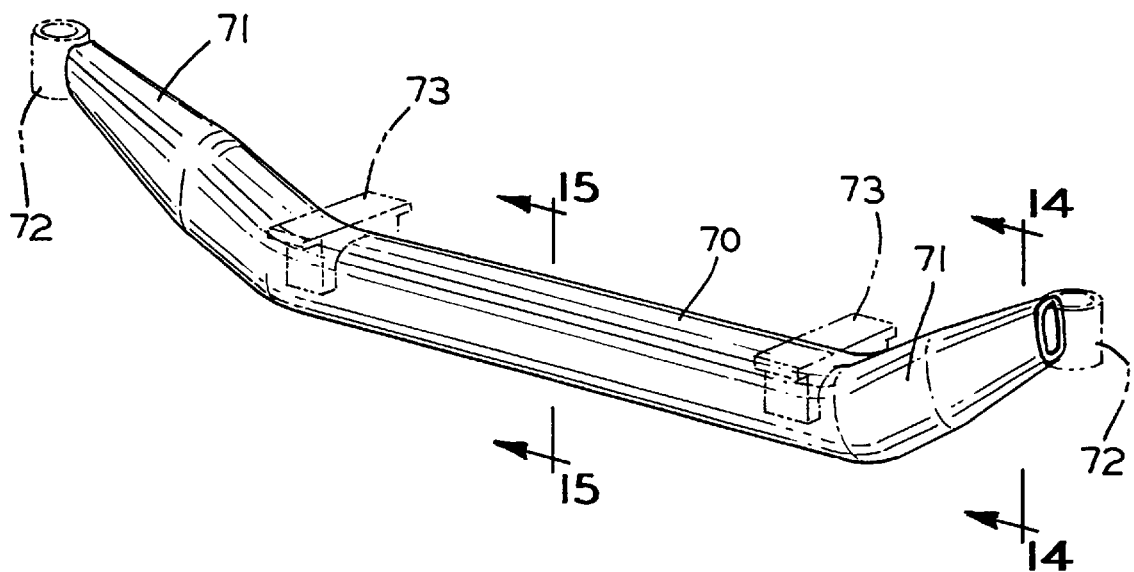
FIG. 13 is a perspective view of a fourth embodiment of a non-driving, hollow front axle beam manufactured in accordance with the method of this invention that can be used in the frame assembly and suspension system illustrated in FIG. 1.
Figure 14:
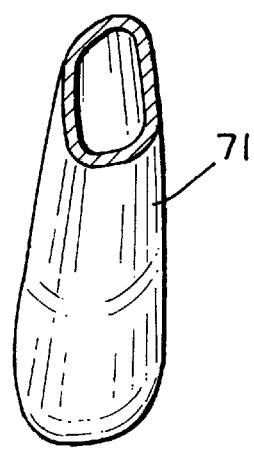
FIG. 14 is an end elevational view of a portion of the non-driving, hollow front axle beam taken along line 14—14 of FIG. 13.
Figure 15:
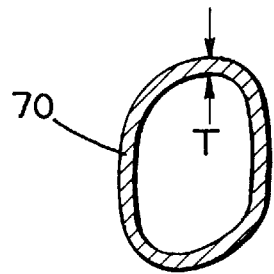
FIG. 15 is a sectional elevational view of a portion of the non-driving, hollow front axle beam taken along line 15—15 of FIG. 13.

Referring now to FIGS. 13, 14, and 15, there is illustrated a fourth embodiment of a non-driving, hollow front axle beam 70 that has been manufactured in accordance with the method of this invention and that can be used in the frame assembly and suspension system 10 illustrated in FIG. 1. As shown therein, the hollow front axle beam 70 is hollow and has a generally oval cross sectional shape throughout most of its entire length. If desired, end portions 71 of the hollow front axle beam 70 can extend at an angle relative to the central portion thereof. A pair of hollow cylindrical supports 72 may be secured to the end portions 71 of the hollow front axle beam 70, such as by welding or other means. The supports 72 are provided to facilitate the pivotable connection between the steering knuckles 21 and the ends of the hollow front axle beam 70 in the manner described above. A pair of mounting pads 73 may also be secured to the hollow front axle beam 70, such as by welding or other means. The mounting pads 73 are provided to facilitate the connection of a pair of resilient spring assemblies (not shown) between the hollow front axle beam 70 and the side rails 11 and 12 of the ladder frame assembly supported thereon in the manner described above. Preferably, the hollow front axle beam 70 has a substantially uniform wall thickness T and a substantially uniform outer diameter D throughout most of its entire length.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a non-driving axle beam for use in a vehicle frame assembly and suspension system comprising the steps of:
   (a) providing a tubular blank having first and second ends;
   (b) placing the tubular blank within in a die having cooperating die sections that define a cavity having a shape that corresponds with the desired shape of the non-driving axle beam;
   (c) providing pressurized fluid within the tubular blank so as to deform the tubular blank into conformance with the die cavity; and
   (d) pivotably connecting a steering knuckle to each of the first and second ends of the non-driving axle beam.

2. The method defined in claim 1 wherein said step (d) is performed by securing a hollow cylindrical support to the first and second ends of the non-driving axle beam and pivotably connecting a steering knuckle to each of the hollow cylindrical supports.

3. The method defined in claim 1 wherein the die has a generally circular-shaped cross section.

4. The method defined in claim 1 wherein the die has a generally triangular-shaped cross section.

5. The method defined in claim 1 wherein the die has a generally I-shaped cross section.

6. The method defined in claim 1 wherein the die has a generally oval-shaped cross section.

7. The method defined in claim 1 wherein the axle beam includes first and second open ends.

8. The method defined in claim 7 wherein the first and second open ends of the axle beam are tapered.

9. The method defined in claim 1 wherein the axle beam is formed from a single piece of metal.

10. The method defined in claim 1 wherein the axle beam has a substantially uniform thickness along its length.

11. The method defined in claim 1 including the further step of securing a mounting pad to the axle beam.

12. The method defined in claim 1 including the further step of securing a pair of mounting pads to the axle beam.

13. The method defined in claim 1 including the further step of forming an aperture through the axle beam.

14. The method defined in claim 1 wherein said step (c) is performed to provide the axle beam with a generally flat surface, and including the further step of forming an aperture through the generally flat surface.

15. A method of manufacturing a combined frame and non-driving axle beam assembly for a vehicle comprising:
   (a) providing a non-driving axle beam by (1) providing a tubular blank having first and second ends, (2) placing the tubular blank within in a die having cooperating die sections that define a cavity having a shape that corresponds with the desired shape of the non-driving axle beam, (3) providing pressurized fluid within the tubular blank so as to deform the tubular blank into conformance with the die cavity, and (4) pivotably connecting a steering knuckle to each of the first and second ends of the non-driving axle beam;
   (b) providing a frame assembly; and
   (c) connecting the non-driving axle beam to the frame assembly to form the combined frame and non-driving axle beam assembly for a vehicle.

16. The method defined in claim 15 wherein said step (a)(4) is performed by securing a hollow cylindrical support to the first and second ends of the non-driving axle beam and pivotably connecting a steering knuckle to each of the hollow cylindrical supports.

17. The method defined in claim 15 wherein the die has a generally circular-shaped cross section.

18. The method defined in claim 15 wherein the die has a generally triangular-shaped cross section.

19. The method defined in claim 15 wherein the die has a generally I-shaped cross section.

20. The method defined in claim 15 wherein the die has a generally oval-shaped cross section.

21. The method defined in claim 15 wherein the axle beam includes first and second open ends.

22. The method defined in claim 21 wherein the first and second open ends of the axle beam are tapered.

23. The method defined in claim 15 wherein the axle beam is formed from a single piece of metal.

24. The method defined in claim 15 wherein the axle beam has a substantially uniform thickness along its length.

25. The method defined in claim 15 including the further step of securing a mounting pad to the axle beam.

26. The method defined in claim 15 including the further step of securing a pair of mounting pads to the axle beam.

27. The method defined in claim 15 including the further step of forming an aperture through the axle beam.

28. The method defined in claim 15 wherein said step (a)(3) is performed to provide the axle beam with a generally flat surface, and including the further step of forming an aperture through the generally flat surface.

29. The method defined in claim 15 wherein said step (c) is performed by providing a resilient spring assembly and connecting the resilient spring assembly between the axle beam and the frame assembly.

30. The method defined in claim 15 wherein said step (c) is performed by providing a plurality of resilient spring assemblies and connecting the resilient spring assemblies between the axle beam and the frame assembly.

* * * * *